(12) United States Patent
Shinoda

(10) Patent No.: US 9,435,256 B2
(45) Date of Patent: Sep. 6, 2016

(54) CONTROL APPARATUS FOR AN INTERNAL COMBUSTION ENGINE

(71) Applicant: Toyota Jidosha Kabushiki Kaisha, Toyota-shi Aichi-ken (JP)

(72) Inventor: Yoshihisa Shinoda, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 121 days.

(21) Appl. No.: 14/462,959

(22) Filed: Aug. 19, 2014

(65) Prior Publication Data
US 2015/0052890 A1 Feb. 26, 2015

(30) Foreign Application Priority Data

Aug. 22, 2013 (JP) ................. 2013-172419

(51) Int. Cl.
| | | |
|---|---|---|
| F02D 23/00 | (2006.01) |
| F01N 5/04 | (2006.01) |
| F01N 3/00 | (2006.01) |
| F01N 1/00 | (2006.01) |
| F02B 37/18 | (2006.01) |

(Continued)

(52) U.S. Cl.
CPC ............ F02B 37/183 (2013.01); F01N 3/103 (2013.01); F01N 3/2892 (2013.01); F01N 13/107 (2013.01); F02B 37/025 (2013.01); F02D 41/0007 (2013.01); F02D 41/0082 (2013.01); F02D 41/025 (2013.01); Y02T 10/144 (2013.01); Y02T 10/26 (2013.01)

(58) Field of Classification Search
CPC .... F02B 37/18; F02B 37/183; F02B 37/186; F02B 37/025; F01N 3/103; F01N 3/2892; F01N 13/107; F02D 41/0007; F02D 41/0082; F02D 41/0085; F02D 41/025
USPC .......................... 60/602, 280, 285, 286, 324; 701/102–104
See application file for complete search history.

(56) References Cited

U.S. PATENT DOCUMENTS

| | | | |
|---|---|---|---|
| 4,611,465 A * | 9/1986 | Kato ...................... | F02B 37/183 60/602 |
| 6,185,938 B1 * | 2/2001 | Zander ................... | F02B 37/18 60/280 |

(Continued)

FOREIGN PATENT DOCUMENTS

| | | | | |
|---|---|---|---|---|
| DE | 4311904 A1 | * | 10/1994 | ........... F01N 3/2006 |
| JP | 10246109 A | * | 9/1998 | .............. F02B 37/18 |

(Continued)

*Primary Examiner* — Thai Ba Trieu
(74) *Attorney, Agent, or Firm* — Dinsmore & Shohl LLP

(57) ABSTRACT

A control apparatus for an internal combustion engine includes a first exhaust passage through which an exhaust gas of a first cylinder group flows, a second exhaust passage through which an exhaust gas of a second cylinder group flows, a third exhaust passage formed by merging of the first exhaust passage and the second exhaust passage, a centrifugal supercharger equipped with a turbine arranged in the third exhaust passage, an exhaust gas purification device arranged in the third exhaust passage at a location downstream of the turbine of the centrifugal supercharger, a bypass passage branching from the first exhaust passage, and merging into the third exhaust passage at a location upstream of the exhaust gas purification device, and a waste gate valve for switching opening and closing of the bypass passage, wherein when inter-cylinder-group imbalance processing is carried out, the bypass passage is made to open.

4 Claims, 10 Drawing Sheets

(51) Int. Cl.
  *F02B 37/02*  (2006.01)
  *F02D 41/00*  (2006.01)
  *F02D 41/02*  (2006.01)
  *F01N 3/10*   (2006.01)
  *F01N 3/28*   (2006.01)
  *F01N 13/10*  (2010.01)

(56) References Cited

U.S. PATENT DOCUMENTS

| | | | | |
|---|---|---|---|---|
| 6,276,138 B1* | 8/2001 | Welch | F02D 17/02 | |
| | | | 60/602 | |
| 6,499,294 B1* | 12/2002 | Katoh | F01N 13/011 | |
| | | | 60/301 | |
| 6,978,204 B2* | 12/2005 | Surnilla | F02D 41/0087 | |
| | | | 701/103 | |
| 7,497,074 B2* | 3/2009 | Surnilla | F01N 13/107 | |
| | | | 60/285 | |
| 7,757,489 B2* | 7/2010 | Endres | F01N 13/009 | |
| | | | 60/602 | |
| 8,056,337 B2* | 11/2011 | Hokuto | F01N 13/107 | |
| | | | 60/602 | |
| 8,516,814 B2* | 8/2013 | Okada | F01N 13/107 | |
| | | | 60/602 | |
| 2009/0292446 A1 | 11/2009 | Tanaka | | |
| 2010/0011762 A1* | 1/2010 | Hokuto | F01N 13/107 | |
| | | | 60/602 | |
| 2011/0126812 A1* | 6/2011 | Miyashita | F02D 41/0007 | |
| | | | 123/703 | |
| 2011/0131978 A1* | 6/2011 | Okada | F02D 41/0007 | |
| | | | 60/602 | |
| 2011/0139120 A1* | 6/2011 | Rollinger | F02D 41/008 | |
| | | | 123/436 | |
| 2011/0302917 A1* | 12/2011 | Styles | F02B 37/025 | |
| | | | 60/602 | |
| 2012/0283931 A1* | 11/2012 | Otsuka | F02D 41/0007 | |
| | | | 701/103 | |
| 2012/0291431 A1* | 11/2012 | Bucknell | F02B 37/18 | |
| | | | 60/602 | |
| 2013/0283787 A1* | 10/2013 | Sakata | F02D 41/0007 | |
| | | | 60/605.1 | |

FOREIGN PATENT DOCUMENTS

| | | | | |
|---|---|---|---|---|
| JP | 2002-332833 A | | 11/2002 | |
| JP | 2007154836 A | * | 6/2007 | F02B 37/18 |
| JP | 2008-095542 A | | 4/2008 | |
| JP | 2008-121510 A | | 5/2008 | |

* cited by examiner

CONTROL APPARATUS FOR AN INTERNAL COMBUSTION ENGINE

BACKGROUND OF THE INVENTION

1. Field of the Invention

The present invention relates to a control apparatus for an internal combustion engine in which a turbine of a centrifugal supercharger (turbocharger) is arranged in an exhaust passage, and in particular to a technology in which unburnt fuel and oxygen are supplied to an exhaust gas purification device arranged in the exhaust passage downstream of the turbine.

2. Description of the Related Art

As a method of raising the temperature of an exhaust gas purification device arranged in an exhaust passage of an internal combustion engine, a mixture of an air fuel ratio (lean air fuel ratio) higher than a stoichiometric air fuel ratio is caused to combust or burn in a part of cylinders of the internal combustion engine, and a mixture of an air fuel ratio (rich air fuel ratio) lower than the stoichiometric air fuel ratio is caused to combust or burn in the remaining cylinders. According to such a method, an exhaust gas containing excessive oxygen is discharged from the cylinders (hereinafter referred to as "lean operating cylinders") in which the mixture of the lean air fuel ratio is combusted. In addition, an exhaust gas containing excessive unburnt fuel is discharged from the cylinders (hereinafter "rich operating cylinders") in which the mixture of the rich air fuel ratio is combusted. When these exhaust gases are mutually mixed with each other, the excessive unburnt fuel and the excessive oxygen will react with each other, so that the exhaust gas purification device will be warmed by means of reaction heat generated at that time.

However, when the unburnt fuel and the oxygen react with each other in a position away from the exhaust gas purification device in the exhaust passage at the upstream side of the exhaust gas purification device, a part of the reaction heat is dissipated or radiated through the wall surface of the exhaust passage, thus giving rise to a possibility that it may become unable to raise the temperature of the exhaust gas purification device in a quick manner.

In order to solve such a problem, there is proposed a construction in which a plurality of cylinders provided in an internal combustion engine are divided into two cylinder groups, and an exhaust passage is formed in such a manner that exhaust gases in these two cylinder groups may join or merge at an immediately upstream side of an exhaust gas purification device. In such a construction, there is also proposed a method of joining or mixing the exhaust gases in the two cylinder groups at the immediately upstream side of the exhaust gas purification device, by carrying out a lean operation of one cylinder group, and by carrying out a rich operation of the other cylinder group (for example see a first patent literature).

PRIOR ART REFERENCES

Patent Documents

[Patent Document 1] Japanese patent laid-open publication No. 2002-332833
[Patent Document 2] Japanese patent laid-open publication No. 2008-095542

SUMMARY OF THE INVENTION

However, in a construction in which a turbine of a centrifugal supercharger (turbocharger) is arranged in an exhaust passage at the upstream side of an exhaust gas purification device, exhaust gases from two cylinder groups are mixed with each other in the turbine, so an amount of unburnt fuel reacting in the exhaust gas purification device may become small. As a result, an amount of reaction heat, which contributes to raising the temperature of the exhaust gas purification device, may also become small.

In contrast to this, there can be considered a method of forming an exhaust passage in such a manner that an exhaust gas discharged from a part of cylinders of an internal combustion engine flows, while bypassing a turbine. However, in cases where a target supercharging pressure becomes high, as in the case where the load of the internal combustion engine becomes high, the amount of the exhaust gas flowing through the turbine becomes small, so there is a possibility that an actual supercharging pressure may become unable to reach the target supercharging pressure.

The present invention has been made in view of the various circumstances as referred to above, and the object of the invention is to provide a technology in which the temperature of an exhaust gas purification device can be made to rise more quickly, while suppressing a reduction in supercharging effect, in a control apparatus for an internal combustion engine with a turbine of a centrifugal supercharger arranged in an exhaust passage at the upstream side of the exhaust gas purification device.

In order to solve the above-mentioned problems, the present invention proposes that an exhaust gas of rich operating cylinders and an exhaust gas of lean operating cylinders are made to flow independently from each other up to immediately upstream of an exhaust gas purification device, by making use of a bypass passage through which the exhaust gases flow while bypassing a turbine, and a waste gate valve which serves to switch the opening and closing of the bypass passage.

Specifically, a control apparatus for an internal combustion engine of the present invention is provided with:

an internal combustion engine having a plurality of cylinders which are grouped into a first cylinder group and a second cylinder group;

a first exhaust passage that is connected to the internal combustion engine, with an exhaust gas of the first cylinder group flowing therethrough;

a second exhaust passage that is connected to the internal combustion engine, with an exhaust gas of the second cylinder group flowing therethrough;

a third exhaust passage that is formed by merging of the first exhaust passage and the second exhaust passage;

a centrifugal supercharger that is equipped with a turbine arranged at a merging portion of the first exhaust passage and the second exhaust passage or in the third exhaust passage;

an exhaust gas purification device that is arranged in the third exhaust passage at a location downstream of the turbine of the centrifugal supercharger, with a catalyst having an oxidation function being received therein;

a bypass passage that branches from the first exhaust passage, and merges into the third exhaust passage at a location upstream of the exhaust gas purification device, while bypassing the turbine;

a waste gate valve that switches opening and closing of the bypass passage;

a processing unit that carries out imbalance processing, which is processing in which an air fuel ratio of a mixture to be combusted in a cylinder of either one of the first cylinder group and the second cylinder group is made richer than a stoichiometric air fuel ratio, and an air fuel ratio of a mixture to be combusted in a cylinder of the other of the first cylinder group and the second cylinder group is made leaner than the stoichiometric air fuel ratio; and a control unit that controls the waste gate valve so as to open the bypass passage, in cases where the imbalance processing is carried out by said processing unit.

According to the control apparatus for an internal combustion engine constructed in this manner, in cases where the imbalance processing is carried out, at least a part of the exhaust gas discharged from the first cylinder group will flow through the bypass passage. For that reason, at least a part of the exhaust gas discharged from the first cylinder group will flow into the third exhaust passage, while bypassing the turbine. In that case, the exhaust gas having bypassed the turbine and the exhaust gas having passed through the turbine join or merge with each other at an immediately upstream side of the exhaust gas purification device. As a result, an amount of unburnt or uncombusted fuel and oxygen which react at the immediately upstream side of the exhaust gas purification device and in the exhaust gas purification device, among the unburnt fuel contained in the exhaust gas (hereinafter, referred to as a "rich gas") of the rich operating cylinders and the oxygen contained in the exhaust gas (hereinafter, referred to as a "lean gas") of the lean operating cylinders, increases.

In addition, the exhaust gas having bypassed the turbine is not deprived of heat by means of the turbine, and hence is introduced to the immediately upstream side of the exhaust gas purification device, while keeping a relatively high temperature. In that case, the reaction of the unburnt fuel with oxygen at the immediately upstream side of the exhaust gas purification device as well as in the exhaust gas purification device becomes more active, and at the same time, an amount of heat to be transmitted from the exhaust gas to the exhaust gas purification device increases.

Accordingly, according to the control apparatus for an internal combustion engine of the present invention, it becomes possible to increase an amount of heat contributing to raising the temperature of the exhaust gas purification device. In addition, according to the control apparatus for an internal combustion engine of the present invention, in cases where it is not necessary to carry out the imbalance processing, the bypass passage can be interrupted or closed, so that it is also possible to suppress a reduction in supercharging effect at the time of high load operation, etc. Moreover, the control apparatus for an internal combustion engine according to the present invention can be achieved by improving or modifying the bypass passage and the waste gate valve, and hence, it is not necessary to change the construction of an exhaust system to a large extent.

In the control apparatus for an internal combustion engine according to the present invention, in the case of carrying out the imbalance processing, the processing unit may make an air fuel ratio of a mixture to be combusted in a cylinder of the first cylinder group richer than the stoichiometric air fuel ratio, and at the same time, may make an air fuel ratio of a mixture to be combusted in a cylinder of the second cylinder group leaner than the stoichiometric air fuel ratio.

In cases where the rich gas of a high temperature and the lean gas of a low temperature are mixed with each other, the reaction of the unburnt fuel with oxygen becomes more active, in comparison with the case where the lean gas of a high temperature and the rich gas of a low temperature are mixed with each other. For that reason, in cases where the cylinders of the first cylinder group are made to operate at a rich air fuel ratio and the cylinders of the second cylinder group are made to operate at a lean air fuel ratio, the reaction of the unburnt fuel with oxygen becomes more active, in comparison with the case where the cylinders of the first cylinder group are made to operate at a lean air fuel ratio and at the same time the cylinders of the second cylinder group are made to operate at a rich air fuel ratio. As a result, an amount of reaction heat, which contributes to raising the temperature of the exhaust gas purification device, can be made much larger.

Here, in cases where a target supercharging pressure is high, as in the case where the load of the internal combustion engine is large, when the bypass passage is opened, an actual supercharging pressure may not reach the target supercharging pressure. Accordingly, in such a case, it is necessary to cause the temperature of the exhaust gas purification device to rise, while blocking (i.e., closing) the bypass passage.

Accordingly, in cases where the bypass passage can not be made to open, the processing unit according to the present invention may carry out processing in which an air fuel ratio of a mixture to be combusted in each of a part of the cylinders of the first cylinder group is made leaner than the stoichiometric air fuel ratio, and at the same time, an air fuel ratio of a mixture to be combusted in each of the remaining cylinders of the first cylinder group is made richer than the stoichiometric air fuel ratio, and processing in which an air fuel ratio of a mixture to be combusted in each of a part of the cylinders of the second cylinder group leaner than the stoichiometric air fuel ratio, and at the same time, an air fuel ratio of a mixture to be combusted in each of the remaining cylinders of the second cylinder group is made richer than the stoichiometric air fuel ratio. In other words, the processing unit may carry out the processing of making the air fuel ratio different between the cylinders included in the first cylinder group, and the processing of making the air fuel ratio different between the cylinders included in the second cylinder group (hereinafter, these processings are generically named "inter-cylinder imbalance processing").

In that case, the exhaust gas (rich gas) discharged from the rich operating cylinders of the first cylinder group and the exhaust gas (lean gas) discharged from the lean operating cylinders of the first cylinder group are merged or mixed with each other immediately after being discharged from those cylinders. Similarly, the exhaust gas (rich gas) discharged from the rich operating cylinders of the second cylinder group and the exhaust gas (lean gas) discharged from the lean operating cylinders of the second cylinder group are merged or mixed with each other immediately after being discharged from those cylinders.

On the other hand, in cases where the rich operation of all the cylinders of the first cylinder group is carried out and at the same time the lean operation of all the cylinders of the second cylinder group is operated in a state where the bypass passage is blocked or closed, or in cases where the lean operation of all the cylinders of the first cylinder group is carried out and at the same time the rich operation of all the cylinders of the second cylinder group is carried out in the same state, the lean gas and the rich gas are merged or mixed with each other in the merging portion of the first exhaust passage and the second exhaust passage. In other words, in cases where the processing of making the air fuel ratio different between the first cylinder group and the second cylinder group (hereinafter, referred to as "inter-cylinder-group imbalance processing") is carried out, the rich gas and the lean gas are merged or mixed with each other at the downstream side of the merging portion of the first exhaust passage and the second exhaust passage.

Accordingly, in cases where the inter-cylinder imbalance processing is carried out, the atmosphere at the time when the rich gas and the lean gas are merged or mixed with each other becomes higher in temperature, in comparison with the case where the inter-cylinder-group imbalance processing is carried out. Accordingly, in cases where the inter-cylinder imbalance processing is carried out, the amount of reaction of the unburnt fuel with oxygen becomes larger, in comparison with the case where the inter-cylinder-group imbalance processing is carried out. As a result, even in cases where the bypass passage can not be made to open, the amount of reaction heat, which contributes to raising the temperature of the exhaust gas purification device, can be made as much as possible.

Here, note that in cases where either one of the first cylinder group and the second cylinder group includes only one cylinder, an air fuel ratio of a mixture to be combusted in that cylinder need only be adjusted to an ordinary air fuel ratio (i.e., a target air fuel ratio decided according to an operating condition of the internal combustion engine), and the inter-cylinder imbalance processing need only be carried out only in the other cylinder group including a plurality of cylinders.

Next, the control apparatus for an internal combustion engine according to the present invention may be further provided with: an auxiliary bypass passage that branches from the second exhaust passage, and merges into the third exhaust passage at a location upstream of the exhaust gas purification device, while bypassing the turbine; and an auxiliary waste gate valve that switches blocking and conduction (i.e., opening and closing) of the auxiliary bypass passage. In that case, in cases where the imbalance processing is carried out by the processing unit, the control unit may control the waste gate valve so that the bypass passage is opened, and it may also control the auxiliary waste gate valve so that the auxiliary bypass passage is opened.

According to such a construction, at least a part of the exhaust gas of the second cylinder group, in addition to at least a part of the exhaust gas of the first cylinder group, will also flow while bypassing the turbine. In that case, the amount of heat taken from the exhaust gas to the turbine is further decreased. As a result, an oxidation reaction of the unburnt fuel with oxygen at the immediately upstream side of the exhaust gas purification device as well as in the exhaust gas purification device becomes much more active. Accordingly, the amount of reaction heat contributing to raising the temperature of the exhaust gas purification device can be increased much more.

Moreover, in the construction provided with the waste gate valve and the auxiliary waste gate valve, it becomes possible to arbitrarily switch between a state of opening both the bypass passage and the auxiliary bypass passage, and a state of opening either one of the bypass passage and the auxiliary bypass passage.

For example, in cases where the target supercharging pressure at the time of the imbalance processing being carried out is low, both the bypass passage and the auxiliary bypass passage may be made to open, whereas in cases where the target supercharging pressure at the time of the imbalance processing being carried out is high, only either one of the bypass passage and the auxiliary bypass passage may be made to open. Here, note that in cases where only either one of the bypass passage and the auxiliary bypass passage is made to open, it is preferable to open that passage through which the rich gas flows. Thus, when the two waste gate valves are controlled in this manner, the amount of heat contributing to the rise in temperature of the exhaust gas purification device can be made to increase, while suppressing an excessive decrease in the supercharging pressure.

According to the present invention, in a control apparatus for an internal combustion engine with a turbine of a centrifugal supercharger arranged in an exhaust passage at the upstream side of an exhaust gas purification device, the temperature of the exhaust gas purification device can be made to rise more quickly, while suppressing a reduction in supercharging effect.

DESCRIPTION OF THE EMBODIMENTS

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

Figure 1:
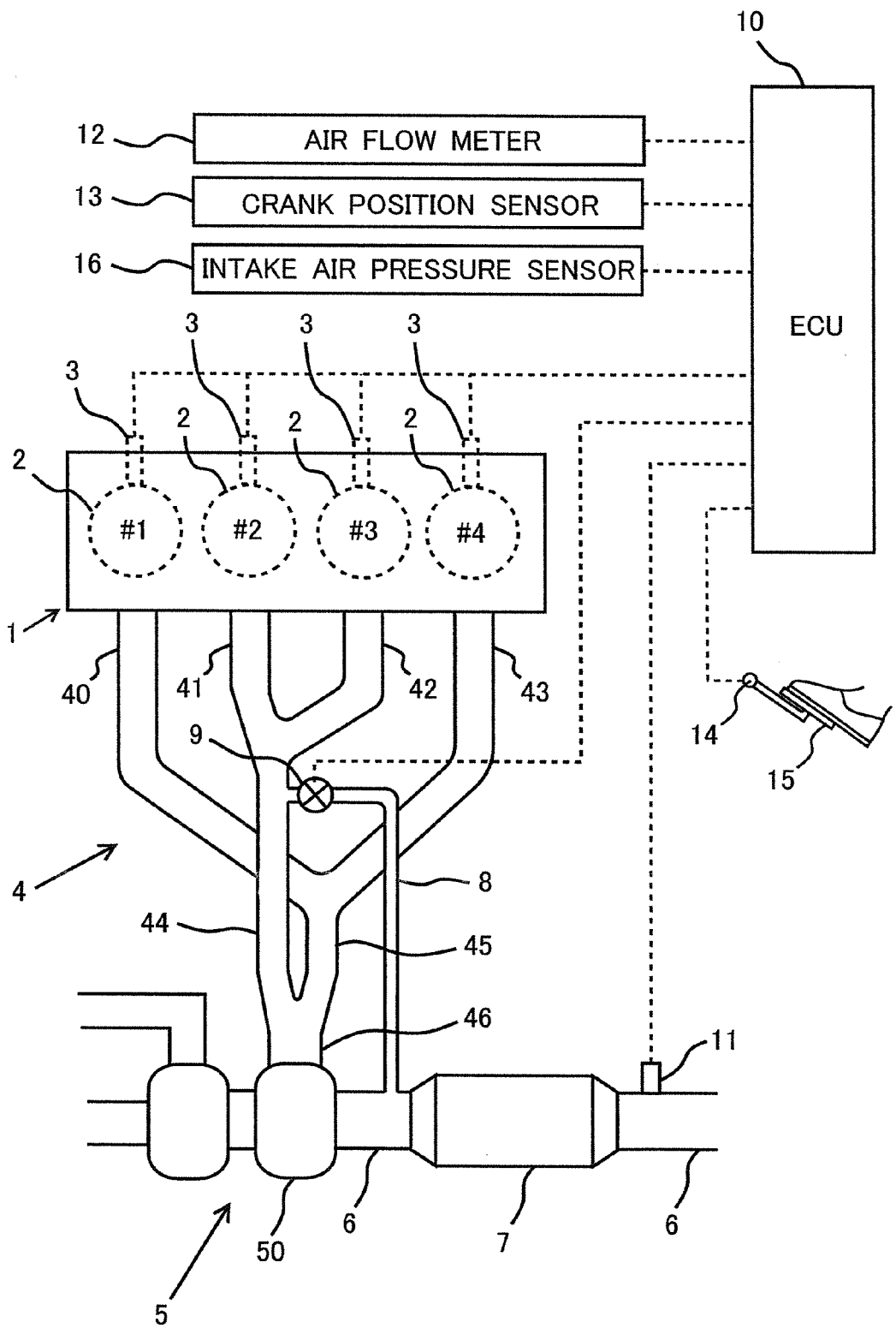
FIG. 1 is a view showing the schematic construction of an internal combustion engine and its exhaust system, to which the present invention is applied.

First, reference will be made to a first embodiment of the present invention based on FIGS. 1 through 7. FIG. 1 is a view showing the schematic construction of an internal combustion engine and its exhaust system, to which the present invention is applied.

The internal combustion engine 1 shown in FIG. 1 is a spark ignition type internal combustion engine (gasoline engine) which is able to carry out a lean combustion (lean burn) operation. Here, note that the internal combustion engine 1 may be a compression ignition type internal combustion engine (diesel engine) in which a lean burn operation is carried out. The internal combustion engine 1 has four cylinders 2 including a first cylinder (#1), a second cylinder (#2), a third cylinder (#3), and a fourth cylinder (#4). These four cylinders 2 are arranged in line or series with one another.

The internal combustion engine 1 is provided with four fuel injection valves 3 for supplying fuel to the individual cylinders 2, respectively. The fuel injection valves 3 may be valve mechanisms which serve to directly inject fuel into the individual cylinders 2, respectively, or may be valve mechanisms which serve to inject fuel into individual intake ports of the cylinders 2, respectively.

The internal combustion engine 1 is connected to an exhaust manifold 4. The exhaust manifold 4 is provided with four branch pipes 40, 41, 42, 43 which are in communication with exhaust ports of the individual cylinders 2, respectively, a pair of merging or junction pipes 44, 45 which are formed by merging of two of the four branch pipes 40, 41, 42, 43, respectively, and one collecting pipe 46 which is formed by merging of the two junction pipes 44, 45.

In an example shown in FIG. 1, the branch pipe 41, which is in communication with the exhaust port of the second cylinder (#2), and the branch pipe 42, which is in communication with the exhaust port of the third cylinder (#3), are joined or merged with each other to form the junction pipe 44 (hereinafter referred to as a "first junction pipe 44"). Also, the branch pipe 40, which is in communication with the exhaust port of the first cylinder (#1), and the branch pipe 43, which is in communication with the exhaust port of the fourth cylinder (#4), are joined or merged with each other to form the junction pipe 45 (hereinafter referred to as a "second junction pipe 45").

Here, the second cylinder (#2) and the third cylinder (#3) correspond to a "first cylinder group" according to the present invention. The first cylinder (#1) and the fourth cylinder (#4) correspond to a "second cylinder group" according to the present invention. In addition, the branch pipe 41, the branch pipe 42 and the first junction pipe 44 correspond to a "first exhaust passage" according to the present invention. The branch pipe 40, the branch pipe 43 and the second junction pipe 45 correspond to a "second exhaust passage" according to the present invention.

The collecting pipe 46 of the exhaust manifold 4 is connected to an inlet of a turbine 50 which constitutes a centrifugal supercharger (turbocharger) 5. An outlet of the turbine 50 is connected to an exhaust pipe 6. Here, note that in cases where the turbine 50 is a turbine of a twin scroll type which has two inlets, the first junction pipe 44 and the second junction pipe 45 may be connected to the turbine 50, without through the collecting pipe 46.

In a middle portion of the exhaust pipe 6, there is arranged an exhaust gas purification device 7. The exhaust gas purification device 7 is provided with a cylindrical casing and a catalyst received in the casing. The catalyst received in the casing of the exhaust gas purification device 7 is a catalyst having an oxidation function, which is, for example, an oxidation catalyst, a three-way catalyst, etc. Here, note that the collecting pipe 46 of the exhaust manifold 4 and the exhaust pipe 6 correspond to a "third exhaust passage" according to the present invention.

In addition, the bypass pipe 8 has an upstream end thereof connected to a middle portion of the first junction pipe 44. The bypass pipe 8 has a downstream end thereof connected to the exhaust pipe 6 at a location between the turbine 50 and the exhaust gas purification device 7. In that case, it is desirable that the downstream end of the bypass pipe 8 be connected to the exhaust pipe 6 in the vicinity of the exhaust gas purification device 7. Here, note that the upstream end of the bypass pipe 8 may be connected to either one of the branch pipe 41 and the branch pipe 42. In addition, the upstream end of the bypass pipe 8 may be branched into two bifurcated pipes, wherein one of the two bifurcated pipes may be connected to the branch pipe 41, and the other of the two bifurcated pipes may be connected to the branch pipe 42.

In the bypass pipe 8, there is arranged a waste gate valve (WGV) 9 which serves to switch the conduction and blocking (i.e., opening and closing) of the bypass pipe 8. The waste gate valve 9 is provided with a valve body 90 which opens and closes an open end of the bypass pipe 8 in the first junction pipe 44, and an actuator 91 which drives the valve body 90 to open and close, for example, as shown in FIG. 2.

Figure 2:
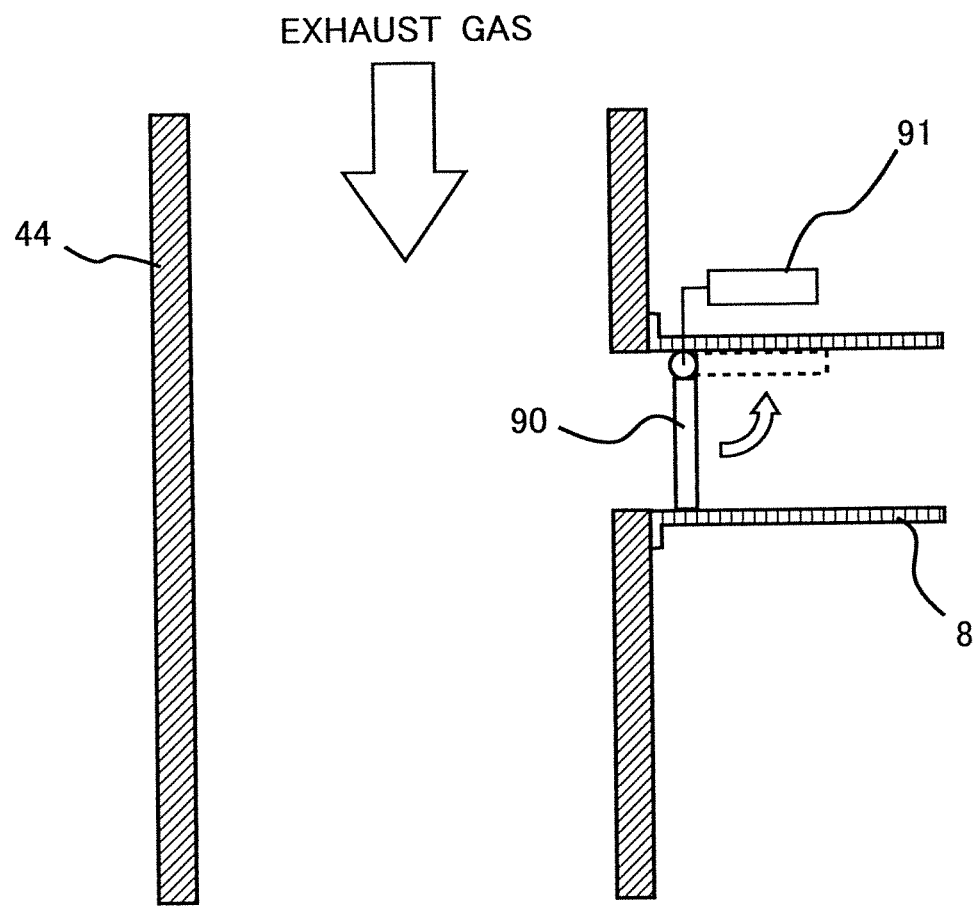
FIG. 2 is a view showing an example of a waste gate valve.
Figure 3:
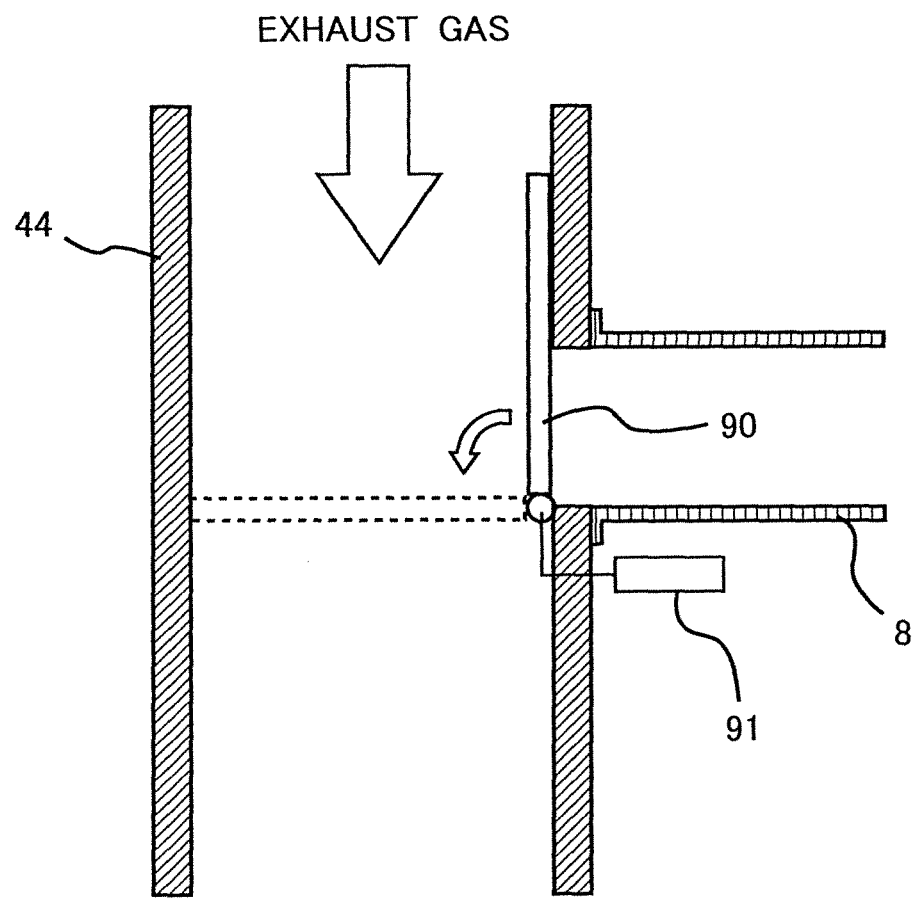
FIG. 3 is a view showing another example of a waste gate valve.

Here, note that the construction of the waste gate valve 9 is not limited to such a construction as shown in FIG. 2, but as long as the opening and closing of the bypass pipe 8 is able to be switched, the waste gate valve 9 may be constructed in any manner. For example, in an example shown in FIG. 2, when the bypass pipe 8 is made conductive (i.e., opened), the first junction pipe 44 will also be in a conductive or opened state, but it may be constructed such that when the bypass pipe 8 is opened, the first junction pipe 44 will be in a blocked or closed state, as shown in FIG. 3.

An ECU 10 is provided in combination with the internal combustion engine 1 as constructed in this manner. The ECU 10 is an electronic control unit which is provided with a CPU, a ROM, a RAM, a backup RAM, and so on. The ECU 10 is electrically connected to a variety of kinds of sensors such as an exhaust gas temperature sensor 11, an air flow meter 12, a crank position sensor 13, an accelerator position sensor 14, an intake air pressure sensor 16, and so on.

The exhaust gas temperature sensor 11 is mounted on the exhaust pipe 6 at a location downstream of the exhaust gas purification device 7, so that it outputs an electrical signal correlated with the temperature of the exhaust gas flowing out of the exhaust gas purification device 7. The air flow meter 12 is arranged in an intake passage of the internal combustion engine 1, so that it outputs an electrical signal correlated with an amount (mass) of intake air flowing in the intake passage. The crank position sensor 13 outputs an electrical signal correlated with the rotational position of a crankshaft of the internal combustion engine 1. The accelerator position sensor 14 outputs an electrical signal correlated with an amount of operation of an accelerator pedal 15 (i.e., a degree of opening of an accelerator). The intake air pressure sensor 16 outputs an electrical signal (intake air pressure) correlated with the pressure inside an unillustrated surge tank.

The ECU 10 controls fuel injection timing, an amount of fuel injection, ignition timing and so on, based on the output signals of the various kinds of sensors as referred to above. For example, the ECU 10 calculates a target air fuel ratio of a mixture based on an engine rotational speed calculated based on the output signal of the crank position sensor 13, and the output signal of the accelerator position sensor 14 (the accelerator opening degree). The ECU 10 calculates a target amount of fuel injection (a fuel injection period) based on the target air fuel ratio and the output signal of the air flow meter 12 (the amount of intake air), and operates the fuel injection valves 3 according to the target amount of fuel injection thus calculated.

Here, note that the ECU 10 sets the target air fuel ratio to a lean air fuel ratio which is higher than a stoichiometric air fuel ratio, in cases where the operating state of the internal combustion engine 1 is in a low rotation and low load region or a middle rotation and middle load region. In addition, the ECU 7 sets the target air fuel ratio to the stoichiometric air fuel ratio or a rich air fuel ratio which is lower than the stoichiometric air fuel ratio, in cases where the operating state of the internal combustion engine 1 is in a high load region or a high rotation region. Thus, when the operating state of the internal combustion engine 1 belongs to the low rotation and low load region or the middle rotation and middle load region, the amount of fuel consumption can be suppressed to a low level by carrying out the lean burn operation of the internal combustion engine 1.

In addition, the ECU 10 calculates a target supercharging pressure based on the engine rotational speed or the accelerator opening degree. Then, in cases where the output signal of the intake air pressure sensor 16 (actual supercharging pressure) is higher than the target supercharging pressure, the ECU 10 controls the waste gate valve 9 so that the bypass pipe 8 is opened. In that case, the amount of the exhaust gas flowing into the turbine 50 is decreased, and hence, the supercharging efficiency of the turbocharger 5 is decreased. As a result, the actual supercharging pressure can be decreased to the target supercharging pressure.

Subsequently, in cases where the temperature of the exhaust gas purification device 7 is low, such as when the internal combustion engine 1 is cold started, the ECU 10 carries out processing for raising the temperature of the exhaust gas purification device 7 (i.e., temperature raising processing). In the following, a method of performing the temperature raising processing in this embodiment will be explained in line with FIG. 4.

Figure 4:
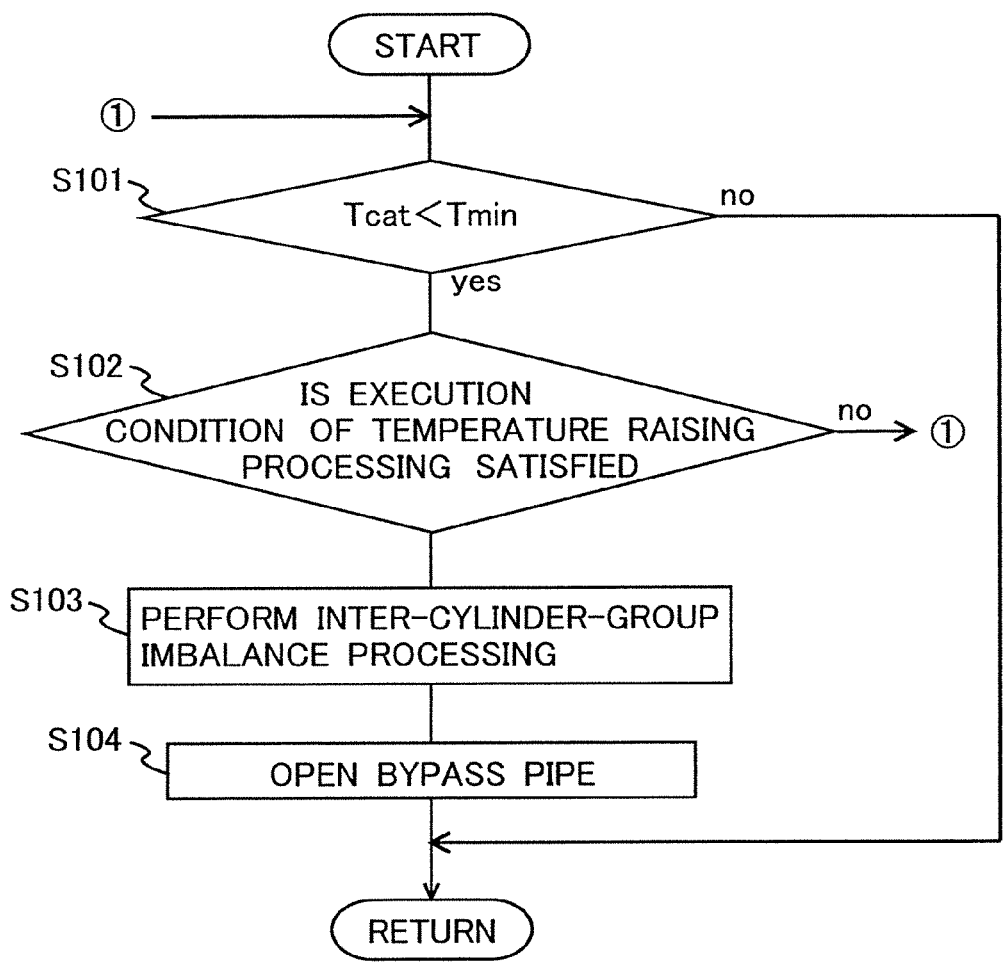
FIG. 4 is a flow chart showing a processing routine which is executed by an ECU at the time when temperature raising processing is carried out in a first embodiment of the present invention.

FIG. 4 is a flow chart which shows a processing routine carried out by the ECU 10, when the temperature raising processing is performed. The processing routine of FIG. 4 has been stored in the ROM, etc., of the ECU 10 in advance, and is carried out in a periodic manner by means of the ECU 10 (CPU).

In the processing routine of FIG. 4, first in the processing of step S101, the ECU 10 determines whether the temperature Tcat of the exhaust gas purification device 7 is lower than a predetermined temperature Tmin. The predetermined temperature Tmin referred to herein is, for example, a temperature which is a lower limit value of a temperature range in which the catalyst received in the exhaust gas purification device 7 is activated, or a temperature which is obtained by adding a certain margin to the lower limit value. In addition, the temperature Tcat of the exhaust gas purification device 7 may be calculated from the operational history of the internal combustion engine 1, the temperature of cooling water, or ambient air temperature. Here, note that because the output signal of the exhaust gas temperature sensor 11 is correlated with the temperature of the exhaust gas purification device 7, the output signal of the exhaust gas temperature sensor 11 may be used as the temperature Tcat of the exhaust gas purification device 7.

In cases where a negative determination is made in the processing of step S101 (Tcat≥Tmin), the ECU 10 once ends the execution of this routine. On the other hand, in cases where an affirmative determination is made in the processing of step S101 (Tcat<Tmin), the routine of the ECU 10 goes to the processing of step S102.

In the processing of step S102, the ECU 10 determines whether an execution condition of the temperature raising processing is satisfied. The execution condition referred to herein is, for example, that the temperature of the internal combustion engine 1 is equal to or higher than a fixed temperature (e.g., a minimum (lowermost) temperature at which it is considered that even if the lean operation and the rich operation are carried out, the combustion state does not become unstable), or the oxidation function of the exhaust gas purification device 7 (e.g., a function to oxidize carbon monoxide (CO) in the exhaust gas) has been activated, etc.

In cases where a negative determination is made in the processing of step S102, the ECU 10 carries out again the processing in step S101 onward. On the other hand, in cases where an affirmative determination is made in the processing of step S102, the ECU 10 carries out the temperature raising processing in the processing of steps S103, S104.

First, in the processing of step S103, the ECU 10 sets the target air fuel ratio of the mixture to be combusted in the first cylinder (#1) and the fourth cylinder (#4) of the internal combustion engine 1 to a lean air fuel ratio higher than the stoichiometric air fuel ratio, and also sets the air fuel ratio of the mixture to be combusted in the second cylinder (#2) and the third cylinder (#3) to a rich air fuel ratio lower than the stoichiometric air fuel ratio. That is, the ECU 10 carries out inter-cylinder-group imbalance processing in which the air fuel ratio of the mixture to be combusted in the first cylinder group, and the air fuel ratio of the mixture to be combusted in the second cylinder group are made different from each other. Here, note that a "processing unit" according to the present invention is achieved by the processing of step S103 carried out by the ECU 10.

In cases where the processing of step S103 (the inter-cylinder-group imbalance processing) is carried out, the rich operation of the first cylinder group including the second cylinder (#2) and the third cylinder (#3) will be carried out, and the lean operation of the second cylinder group including the first cylinder (#1) and the fourth cylinder (#4) will be carried out. In that case, a gas of a rich atmosphere (rich gas) including a large amount of unburnt fuel flows into the first exhaust passage which is composed of the branch pipe 41, the branch pipe 42, and the first junction pipe 44. On the other hand, a gas of a lean atmosphere (lean gas) including a large amount of oxygen flows into the second exhaust passage which is composed of the branch pipe 40, the branch pipe 43, and the second junction pipe 45.

Here, when the rich gas flowing through the first exhaust passage and the lean gas flowing through the second exhaust passage are mixed with each other in the collecting pipe 46 or in the turbine 50, the unburnt fuel contained in the rich gas and the oxygen contained in the lean gas react with each other. For that reason, the amount of the unburnt fuel to be oxidized in the exhaust gas purification device 7 may be decreased. In addition, when the unburnt fuel and the oxygen react with each other in the collecting pipe 46 or in the turbine 50, the temperature of the exhaust gas goes up due to the heat of the reaction. However, the heat of the exhaust gas is dissipated through the wall surface of the collecting pipe 46, or is consumed as a source of power for the turbocharger 5. Accordingly, the reaction heat, which contributes to the rise in the temperature of the exhaust gas purification device 7, may be decreased.

On the other hand, in step S104, the ECU 10 controls the waste gate valve 9 so as to open the bypass pipe 8. For example, the ECU 10 controls the actuator 91 so that the valve body 90 of the waste gate valve 9 is moved or shifted from a state indicated by a solid line in FIGS. 2 and 3 to a state indicated by a dotted line. Here, note that a "control unit" according to the present invention is achieved by carrying out the processing of step S104 by means of the ECU 10.

In cases where the processing of step S104 is carried out, at least a part of the rich gas flowing through the first exhaust passage is introduced to the immediately upstream side of the exhaust gas purification device 7, by passing through the bypass pipe 8. That is, at least a part of the rich gas flowing through the first exhaust passage is introduced to the immediately upstream side of the exhaust gas purification device 7, by bypassing the collecting pipe 46 and the turbine 50. In that case, at least a part of the rich gas arrives at the immediately upstream side of the exhaust gas purification device 7, without the heat thereof being taken by the collecting pipe 46 or the turbine 50. As a result, the rich gas of a high temperature will be merged or mixed with the lean gas at the immediately upstream side of the exhaust gas purification device 7, or in the exhaust gas purification device 7.

When the rich gas of a high temperature is merged or mixed with the lean gas at the immediately upstream side of the exhaust gas purification device 7, or in the exhaust gas purification device 7, the reaction of the unburnt fuel contained in the rich gas with the oxygen contained in the lean gas becomes active, and the amount of the unburnt fuel to be oxidized in the exhaust gas purification device 7 becomes large. In particular, in cases where the waste gate valve 9 is constructed in the manner as described in the above-mentioned explanation of FIG. 3, a most part of the unburnt fuel will be oxidized at the immediately upstream side of the exhaust gas purification device 7, and in the exhaust gas purification device 7. As a result, a relatively large amount of reaction heat will be generated at the immediately upstream side of the exhaust gas purification device 7, or in the exhaust gas purification device 7. Because the most part of reaction heat generated in this manner is transmitted to the exhaust gas purification device 7, the amount of heat contributing to the rise in the temperature of the exhaust gas purification device 7 will be increased. As a result, the temperature of the exhaust gas purification apparatus 7 can be raised in a quick manner.

Here, note that the processing of step S104 may be carried out before the processing of step S103, or at the same time with the processing of step 103.

According to the embodiment as described above, it becomes possible to raise the temperature of the exhaust gas purification device 7 in a quick manner. In addition, in cases where it is not necessary to raise the temperature of the exhaust gas purification device 7, the bypass pipe 8 can be blocked or closed, so that a reduction in supercharging effect at the time of high load operation, etc., can also be suppressed. Moreover, the construction described in this embodiment can be achieved by improving or modifying the bypass passage and the waste gate valve, which are arranged in combination with the turbocharger, and hence, it is not necessary to change the construction of the exhaust system to a large extent.

Here, note that in this embodiment, there has been described an example in which when the temperature raising processing is carried out, the rich operation of the first cylinder group including the second cylinder (#2) and the third cylinder (#3) is carried out, and the lean operation of the second cylinder group including the first cylinder (#1) and the fourth cylinder (#4) is carried out, but instead, the lean operation of the first cylinder group may be carried out and the rich operation of the second cylinder group may be carried out.

However, in cases where the rich gas of a high temperature and the lean gas of a low temperature are mixed with each other at the immediately upstream side of the exhaust gas purification device 7, or in the exhaust gas purification device 7, the reaction of the unburnt fuel with oxygen becomes more active, in comparison with the case where the rich gas of a low temperature and the lean gas of a high temperature are mixed with each other at the immediately upstream side of the exhaust gas purification device 7, or in the exhaust gas purification device 7. For that reason, in cases where the first cylinder group is made to operate at a rich air fuel ratio and the second cylinder group is made to operate at a lean air fuel ratio, the reaction of the unburnt fuel with oxygen becomes more active, in comparison with the case where the first cylinder group is made to operate at a lean air fuel ratio and the second cylinder group is also made to operate at a lean air fuel ratio. Accordingly, it is preferable that the rich operation of the first cylinder group be carried out, and the lean operation of the second cylinder group be carried out.

Figure 5:
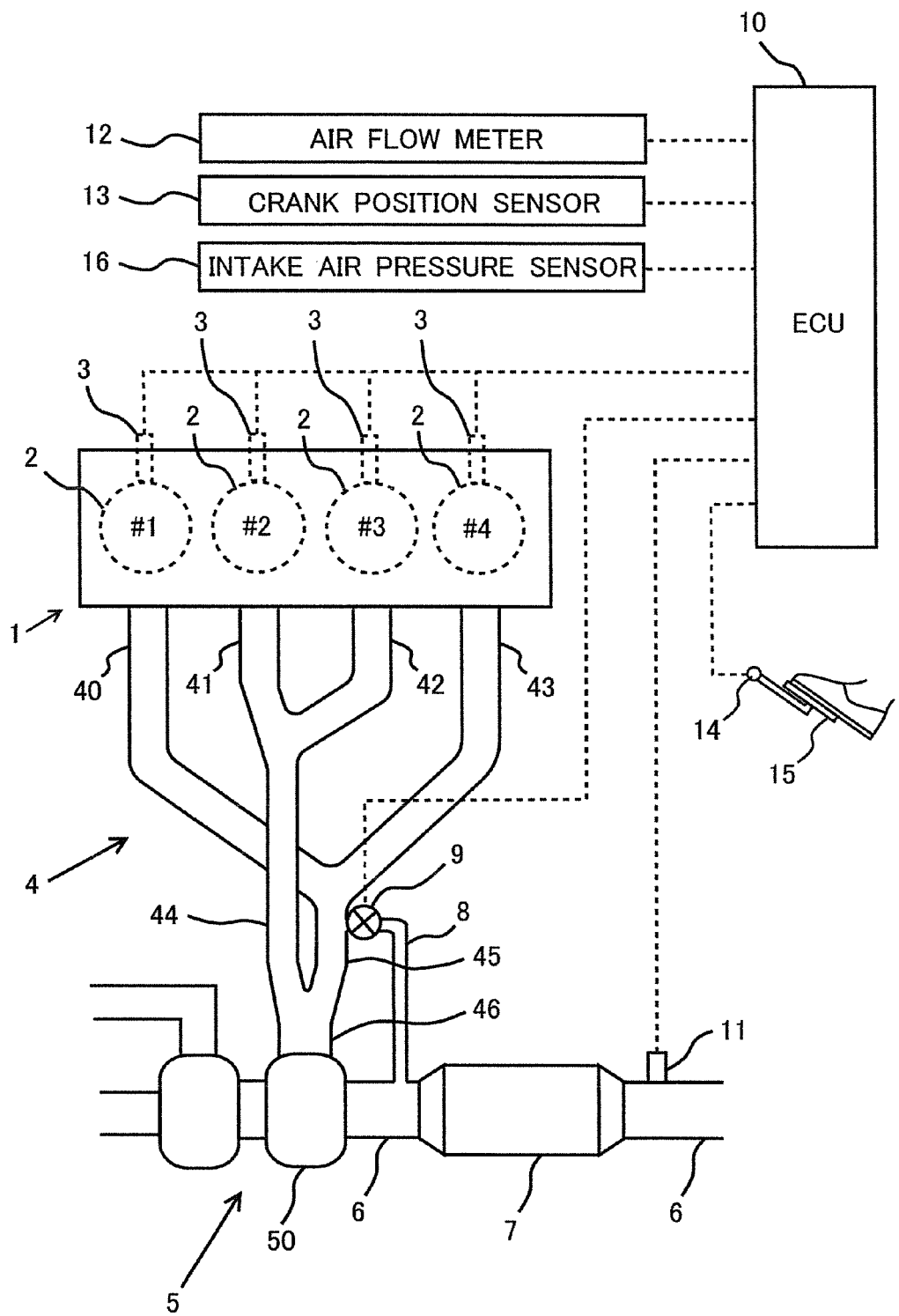
FIG. 5 is a view showing an example in which a bypass passage is connected to a second exhaust passage.

In addition, although in this embodiment, there has been described an example in which the upstream end of the bypass pipe 8 is connected to the first junction pipe 44, the upstream end of the bypass pipe 8 may be connected to the second junction pipe 45, as shown in FIG. 5. However, the second junction pipe 45 tends to become larger in surface area, in comparison with the first junction pipe 44. For that reason, in cases where the upstream end of the bypass pipe 8 is connected to the second junction pipe 45, the temperature of the exhaust gas flowing through the bypass pipe 8 may become lower, in comparison with the case where the upstream end of the bypass pipe 8 is connected to the first junction pipe 44. Accordingly, it is desirable that the upstream end of the bypass pipe 8 be connected to the second junction pipe 45 which is relatively smaller in surface area, among the two junction pipes 44, 45.

Figure 6:
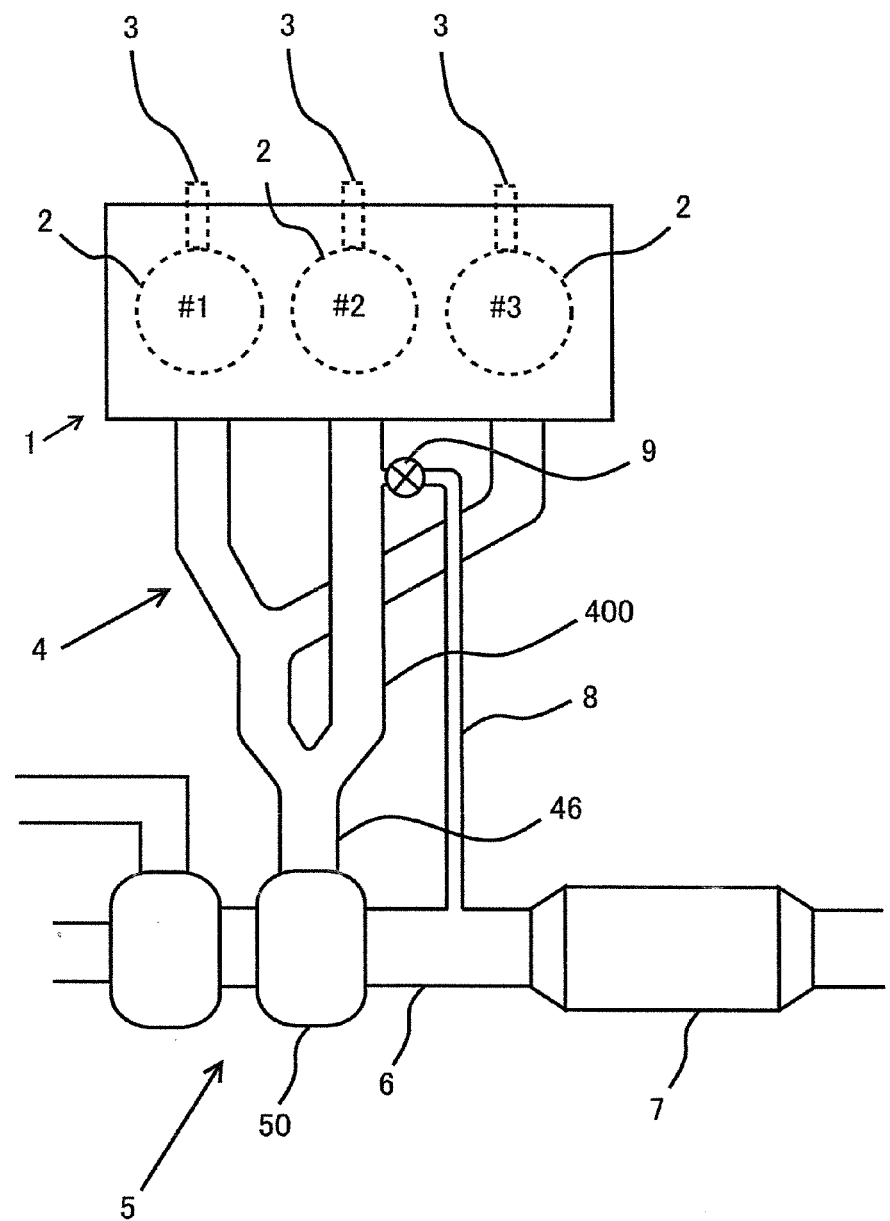
FIG. 6 is a view showing an example of arrangement of a bypass pipe and a waste gate valve in the case where the internal combustion engine has three cylinders.

Here, note that in this embodiment, there has been described an example in which the internal combustion engine 1 has four cylinders, but instead, the internal combustion engine 1 may have three or less cylinders, or may have five or more cylinders. For example, in cases where the internal combustion engine 1 has three cylinders 2, as shown in FIG. 6, the first cylinder group need only be composed of the second cylinder (#2), whereas the second cylinder group need only be composed of the first cylinder (#1) and the third cylinder (#3). In that case, the upstream end of the bypass pipe 8 need only be connected to the exhaust pipe 400 which is in communication with the exhaust port of the second cylinder (#2).

Figure 7:
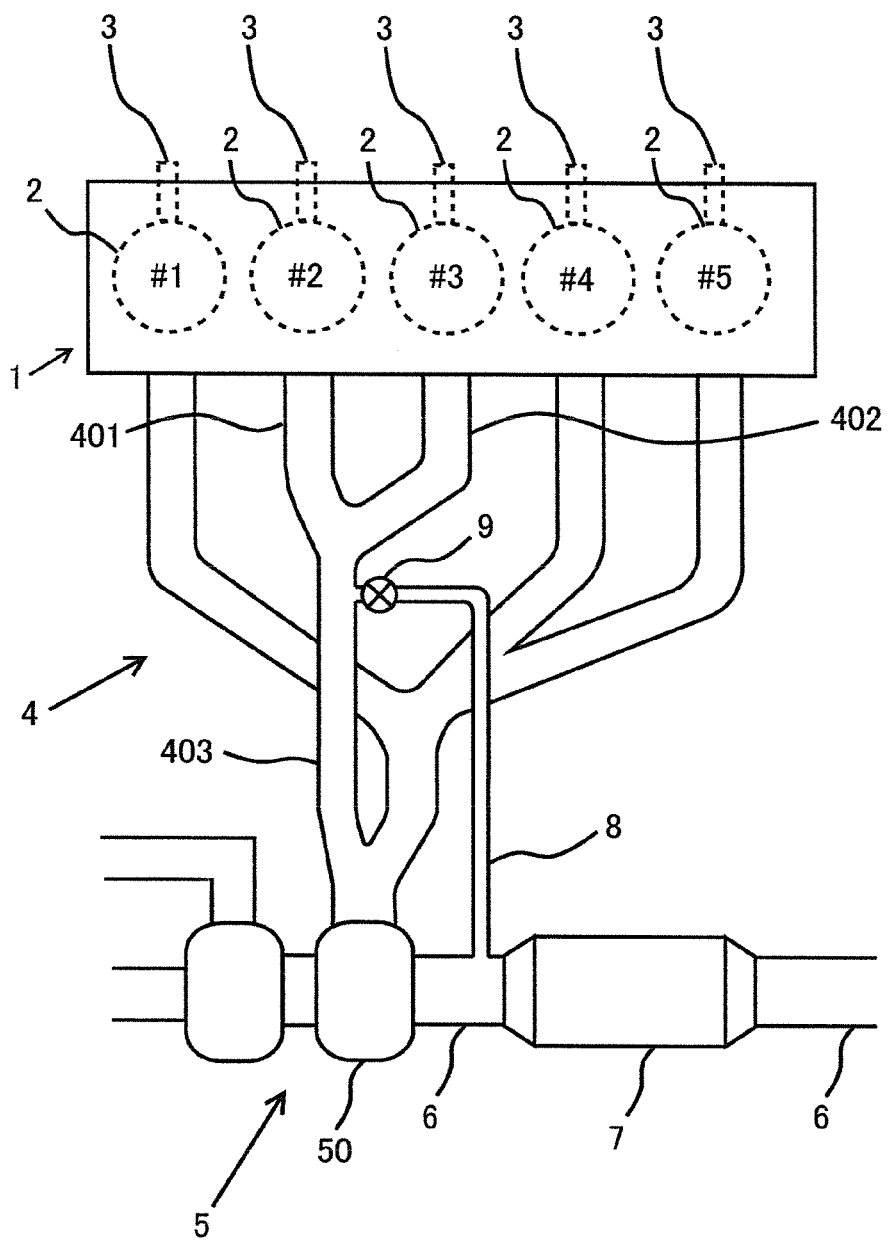
FIG. 7 is a view showing an example of arrangement of a bypass pipe and a waste gate valve in the case where the internal combustion engine has five cylinders.

Moreover, in cases where the internal combustion engine 1 has five cylinders 2, as shown in FIG. 7, the first cylinder group may be composed of the second cylinder (#2) and the third cylinder (#3), whereas the second cylinder group may be composed of the first cylinder (#1), the fourth cylinder (#4) and the fifth cylinder (#5). In that case, the upstream end of the bypass pipe 8 need only be connected to a junction pipe 403 which is formed by joining or merging a branch pipe 401, which is in communication with the exhaust port of the second cylinder (#2), and a branch pipe 402, which is in communication with the exhaust port of the third cylinder (#3), with each other. In addition, in the case where the internal combustion engine 1 has five cylinders 2, the first cylinder group may be composed of the third cylinder (#3) and the fourth cylinder (#4), whereas the second cylinder group may be composed of the first cylinder (#1), the second cylinder (#2) and the fifth cylinder (#5).

Second Embodiment

Next, reference will be made to a second embodiment of the present invention based on FIG. 8. Here, a construction different from that of the above-mentioned first embodiment will be described, and an explanation of the same construction will be omitted.

The difference between the above-mentioned first embodiment and this second embodiment resides in that the temperature raising processing is carried out under the condition that the bypass pipe 8 can not be made conductive or opened.

If the temperature raising processing according to the method described in the above-mentioned first embodiment is carried out when the target supercharging pressure is high, such as at the time the load of the internal combustion engine 1 is large, there will be a possibility that the actual supercharging pressure may not reach the target supercharging pressure.

In contrast to this, in this embodiment, in cases where the bypass pipe 8 can not be made conductive or opened, processing (inter-cylinder imbalance processing) is carried out in which the rich operation of a part of the cylinders 2 is carried out and the lean operation of the remaining cylinders 2 is carried out, in each of the first cylinder group and the second cylinder group.

Specifically, the ECU 10 carries out the lean operation of either one of the second cylinder (#2) and the third cylinder (#3), and the rich operation of the other thereof. In addition, the ECU 10 carries out the lean operation of either one of the first cylinder (#1) and the fourth cylinder (#4), and the rich operation of the other thereof.

In cases where the inter-cylinder imbalance processing as mentioned above is carried out, the rich gas discharged from the rich operating cylinders of the first cylinder group and the lean gas discharged from the lean operating cylinders of the first cylinder group are merged or mixed with each other in the first junction pipe 44. Similarly, the rich gas discharged from the rich operating cylinders of the second cylinder group and the lean gas discharged from the lean operating cylinders of the second cylinder group are merged or mixed with each other in the second junction pipe 45. That is, the rich gas and the lean gas are merged or mixed with each other in a relatively high temperature state immediately after being discharged from the cylinders.

On the other hand, in cases where the inter-cylinder-group imbalance processing is carried out in a state where the bypass passage is blocked or closed, the rich gas and the lean gas are merged or mixed with each other in the collecting pipe 46 or the turbine 50. That is, the rich gas and the lean gas are merged or mixed with each other after a part of the heat contained in those gases are dissipated through the wall surfaces of the joint pipes 44, 45, etc.

Accordingly, in cases where the inter-cylinder imbalance processing is carried out, the atmosphere at the time when the rich gas and the lean gas are merged or mixed with each other becomes higher in temperature, in comparison with the case where the inter-cylinder-group imbalance processing is carried out. Thus, in cases where the inter-cylinder imbalance processing is carried out under the condition that the bypass pipe 8 can not be made conductive (opened), the amount of reaction of the unburnt fuel with oxygen becomes larger, in comparison with the case where the inter-cylinder-group imbalance processing is carried out. As a result, under the condition that the bypass passage 8 can not be made conductive, the amount of the reaction heat, which contributes to raising the temperature of the exhaust gas purification device 7, can be made as much as possible.

Here, note that in cases where either one of the first cylinder group and the second cylinder group includes only one cylinder, the air fuel ratio of a mixture to be combusted in that cylinder need only be adjusted to an ordinary air fuel ratio (i.e., a target air fuel ratio decided according to an operating condition of the internal combustion engine), and the inter-cylinder imbalance processing need only be carried out only in the other cylinder group including a plurality of cylinders. In addition, in cases where either one of the first cylinder group and the second cylinder group includes an odd number of cylinders, the air fuel ratio of a mixture to be combusted in any one of the cylinders need only be set to an ordinary air fuel ratio, and the inter-cylinder imbalance processing need only be carried out in the remaining even number of cylinders.

In the following, an execution procedure of the temperature raising processing in this embodiment will be described in line with FIG. 8. FIG. 8 is a flow chart which shows a processing routine carried out by the ECU 10 at the time the temperature raising processing is performed. Here, note that in the processing routine of FIG. 8, the same symbols are attached to the same processes as those in the above-mentioned processing routine of FIG. 4.

Figure 8:
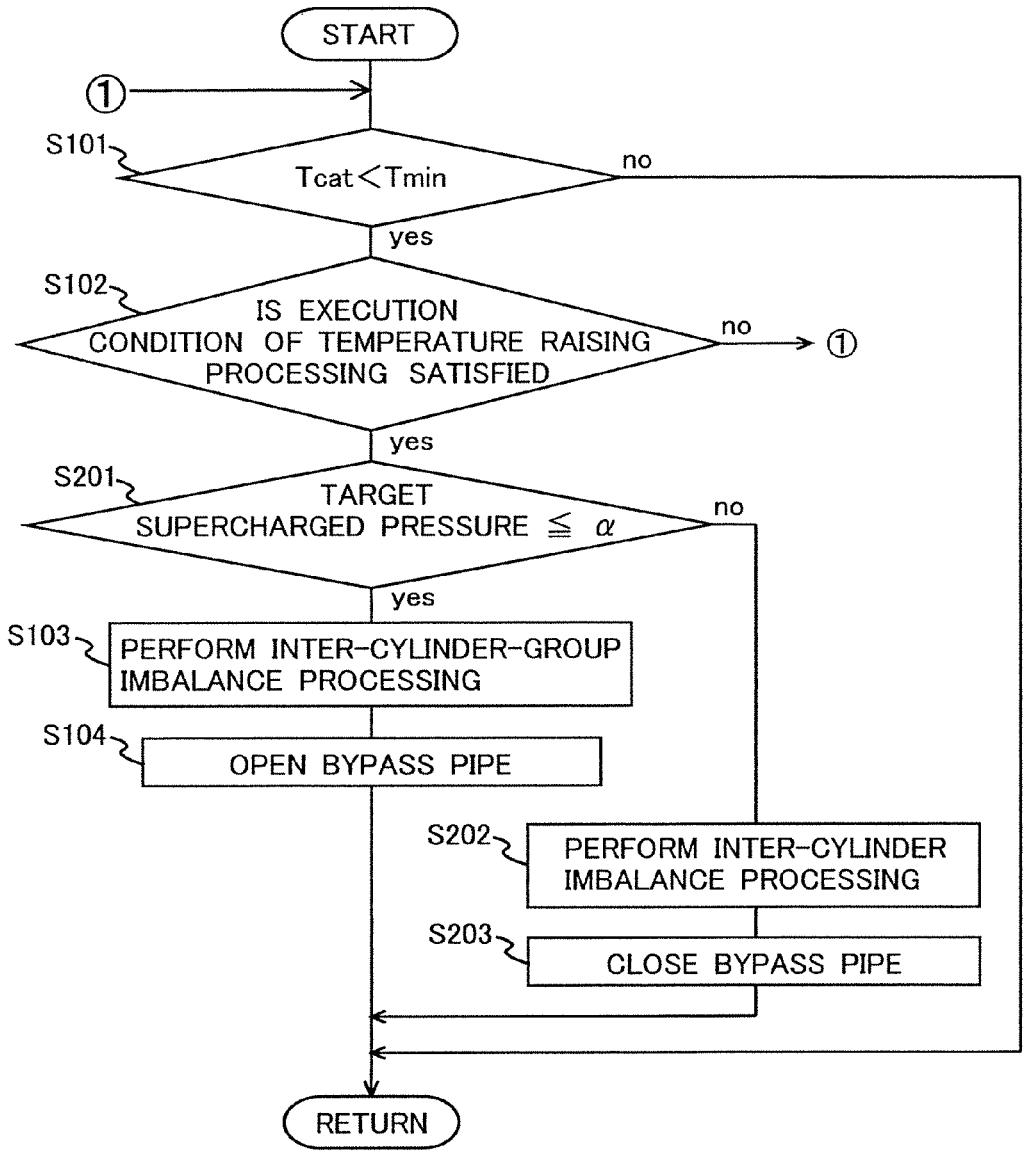
FIG. 8 is a flow chart showing a processing routine which is executed by an ECU at the time when temperature raising processing is carried out in a second embodiment of the present invention.

In the control routine of FIG. 8, in cases where an affirmative determination is made in the processing of step S102, the ECU 10 carries out the processing of step S201. In the processing of step S201, the ECU 10 determines whether the target supercharging pressure is equal to or less than a threshold value $\alpha$. The threshold value $\alpha$ is a maximum supercharging pressure at which the actual supercharging pressure can arrive even if the bypass pipe 8 is opened, or a value which is obtained by subtracting a margin from the maximum supercharging pressure. Here, note that the maximum supercharging pressure which the actual supercharging pressure can arrive at when the bypass pipe 8 is in a conductive (opened) state changes with an operating condition of the internal combustion engine 1 (e.g., the engine rotational speed, the amount of intake air, the amount of fuel injection, etc.), and so the threshold value $\alpha$ may be changed according to the operating condition of the internal combustion engine 1.

In cases where a positive determination is made in the processing of step S201, the ECU 10 carries out the processing in steps S103 and S104. That is, the ECU 10 carries out temperature raising processing by means of the same method as described in the above-mentioned first embodiment. On the other hand, in cases where a negative determination is made in the processing of step S201, the ECU 10 carries out the processing of steps S202, S203.

First, in the processing of step S202, the ECU 10 sets the target air fuel ratio of a mixture in either one of the second cylinder (#2) and the third cylinder (#3) to a rich air fuel ratio lower than the stoichiometric air fuel ratio, and also sets the target air fuel ratio of a mixture in the other cylinder to a lean air fuel ratio higher than the stoichiometric air fuel ratio. Further, the ECU 10 sets the target air fuel ratio of a mixture in either one of the first cylinder (#1) and the fourth cylinder (#4) to a rich air fuel ratio lower than the stoichiometric air fuel ratio, and also sets the target air fuel ratio of a mixture in the other cylinder to a lean air fuel ratio higher than the stoichiometric air fuel ratio.

Subsequently, in the processing of step S203, the ECU 10 controls the waste gate valve 9 so as to block or close the bypass pipe 8. Here, note that in cases where the bypass pipe 8 is already blocked or closed at the time when the processing of step S203 is carried out, the ECU 7 may skip the processing of step S203. In addition, the processing of step S203 may be carried out before the processing of step S202 is carried out, or at the same time with the processing of step S202.

When the processing of steps S202, S203 is carried out, the rich gas discharged from the rich operating cylinders of the first cylinder group and the lean gas discharged from the lean operating cylinders of the first cylinder group are merged or mixed with each other in an atmosphere of a high temperature. Similarly, the rich gas discharged from the rich operating cylinders of the second cylinder group and the lean gas discharged from the lean operating cylinders of the second cylinder group are merged or mixed with each other in an atmosphere of a high temperature. As a result, the amount of reaction heat, which contributes to raising the temperature of the exhaust gas purification device 7, can be made as much as possible.

Third Embodiment

Next, reference will be made to a third embodiment of the present invention based on FIG. 9. Here, a construction different from that of the above-mentioned first embodiment will be described, and an explanation of the same construction will be omitted.

The difference between the above-mentioned first embodiment and this third embodiment is that an auxiliary bypass pipe 80 is provided which serves to place the second junction pipe 45 and the exhaust pipe 6 at the immediately upstream side of the exhaust gas purification device 7 in communication with each other, in addition to the bypass pipe 8 which serves to place the first junction pipe 44 and the exhaust pipe 6 at the immediately upstream side of the exhaust gas purification device 7 in communication with each other.

Figure 9:
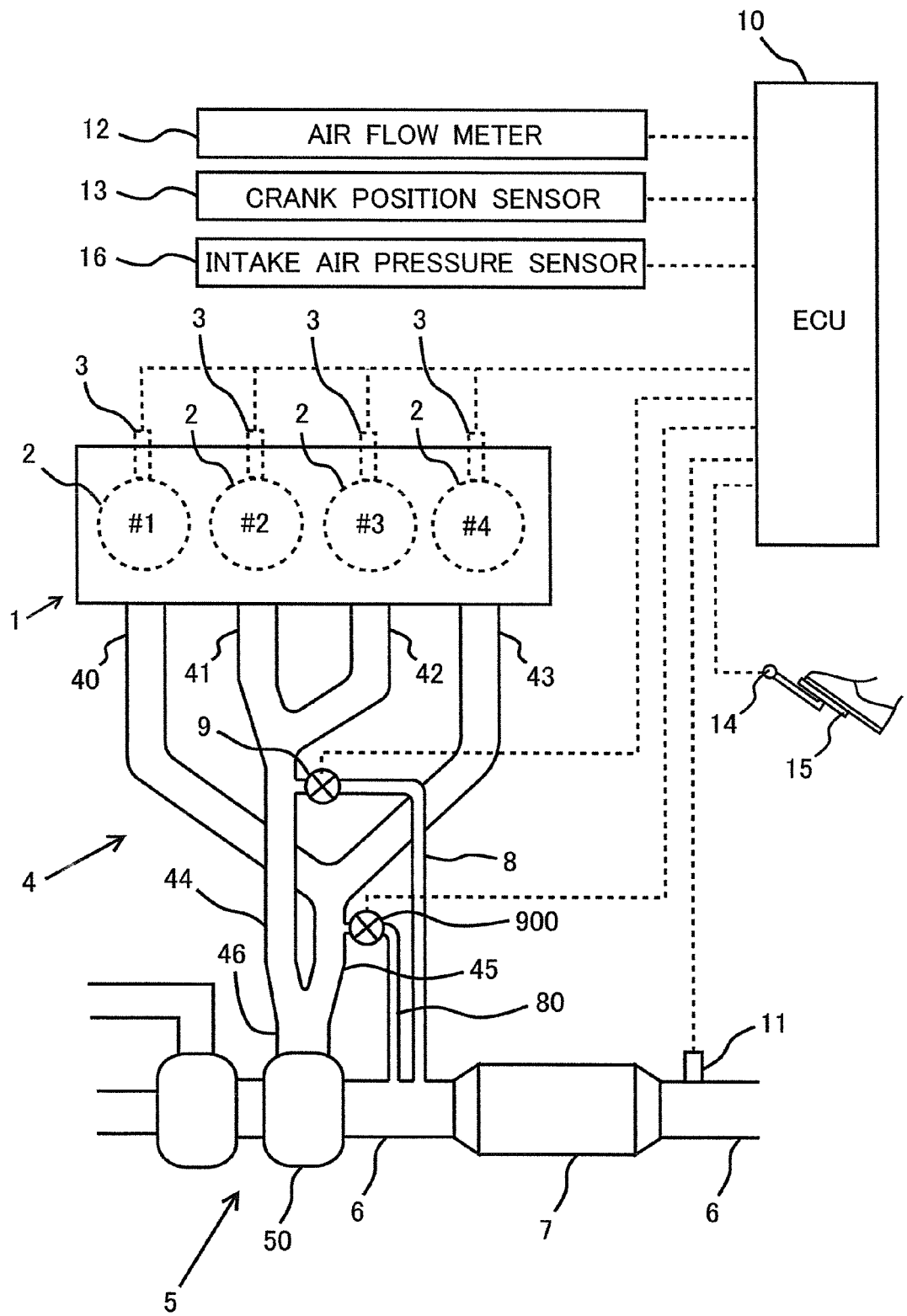
FIG. 9 is a view showing the schematic construction of an internal combustion engine and its exhaust system in a third embodiment of the present invention.

FIG. 9 is a view showing the schematic construction of the internal combustion engine 1 and its exhaust system according to this third embodiment of the present invention. Here, note that in FIG. 9, the same symbols are attached to the same components as those in the above-mentioned first embodiment.

Figure 10:
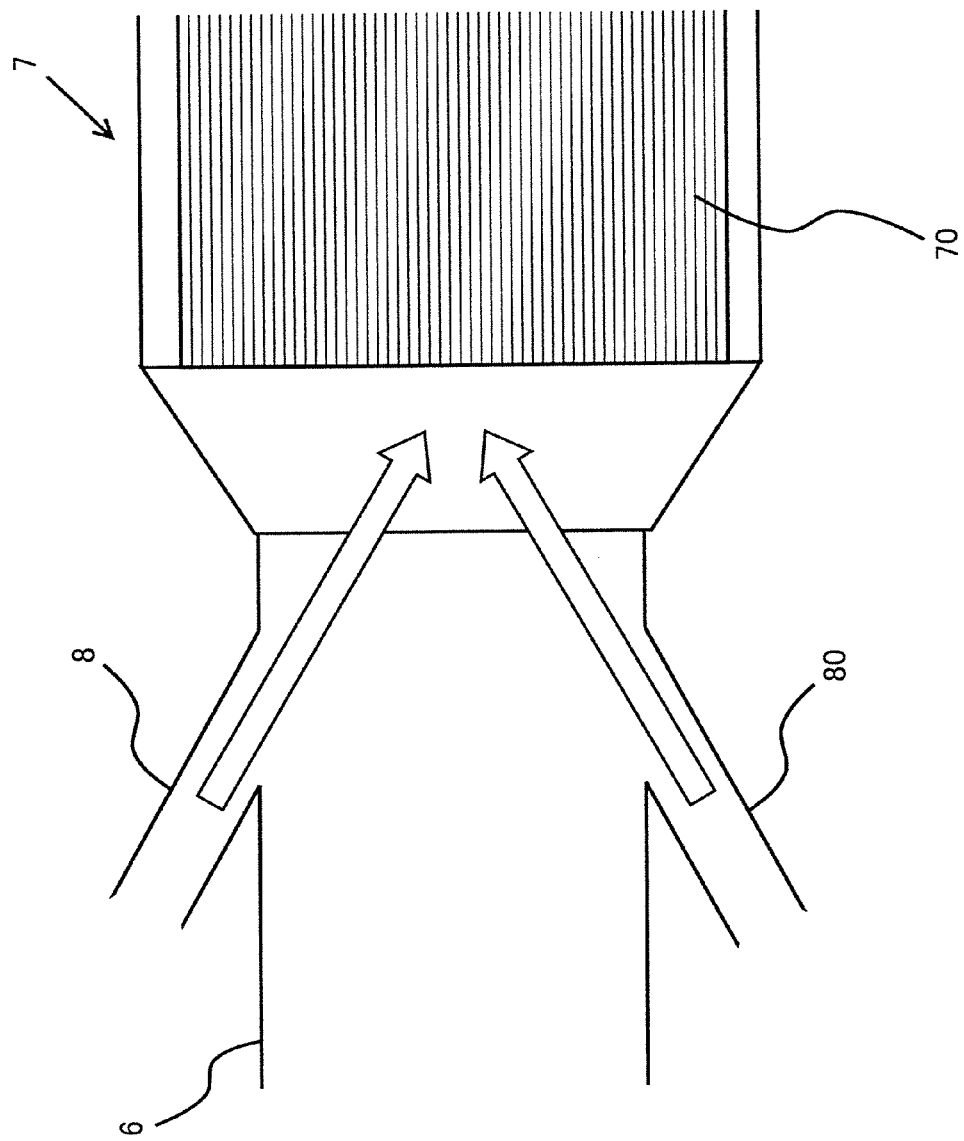
FIG. 10 is a view showing an example of connection of a bypass pipe and an auxiliary bypass pipe with an exhaust pipe.

In FIG. 9, the auxiliary bypass pipe 80 has an upstream end thereof connected to a middle portion of the second junction pipe 45. The auxiliary bypass pipe 80 has a downstream end thereof connected to the exhaust pipe 6 at a location between the turbine 50 and the exhaust gas purification device 7. In that case, it is preferable that the downstream end of the bypass pipe 8 and the downstream end of the auxiliary bypass pipe 80 be connected to the exhaust pipe 6 in such a manner, that exhaust gases flowing from these bypass pipes 8 and auxiliary bypass pipe 80 into the exhaust pipe 6 are directed to an upstream side end face of a catalyst 70 received in the exhaust gas purification device 7, as shown in FIG. 10.

In addition, in the auxiliary bypass pipe 80, there is arranged an auxiliary waste gate valve 900 which serves to switch the conduction and blocking (i.e., opening and closing) of the auxiliary bypass pipe 80. Similar to the waste gate valve 9, the auxiliary waste gate valve 900 is provided with a valve body and an actuator, wherein the actuator is controlled by the ECU 10.

In such a construction, in cases where inter-cylinder-group imbalance processing is carried out, the ECU 10 controls the waste gate valve 9 and the auxiliary waste gate valve 900 so that the bypass pipe 8 and the auxiliary bypass pipe 80 as well are made conductive or opened. In that case, at least a part of rich gases discharged from the second cylinder (#2) and the third cylinder (#3) of the first cylinder group is introduced to the immediately upstream side of the exhaust gas purification device 7, by passing through the bypass pipe 8. Also, at least a part of lean gases discharged from the first cylinder (#1) and the fourth cylinder (#4) of the second cylinder group is introduced to the immediately upstream side of the exhaust gas purification device 7, by passing through the auxiliary bypass pipe 80. That is, at least a part of the lean gases, in addition to at least a part of the rich gases, is also introduced to the immediately upstream side of the exhaust gas purification device 7, by bypassing the collecting pipe 46 and the turbine 50.

As a result, the rich gas and the lean gas will be merged and collected in the high temperature atmosphere. As a result, the oxidation reaction of the unburnt fuel with oxygen at the immediately upstream side of the exhaust gas purification device 7 or in the exhaust gas purification device 7 becomes much more active, so that the amount of heat contributing to raising the temperature of the exhaust gas purification device 7 is increased much more. In addition, as described in the explanation of FIG. 10, when the downstream end of the bypass pipe 8 and the downstream end of the auxiliary bypass pipe 80 are connected to the exhaust pipe 6, the rich gas of a high temperature and the lean gas of a high temperature will be merged or mixed at the upstream side end face of the catalyst 70, and hence, the amount of reaction of the unburnt fuel and oxygen in the catalyst 70 will become larger.

Here, note that when both of the bypass pipe 8 and the auxiliary bypass pipe 80 are opened, the flow rate of the exhaust gas passing through the turbine 50 will become smaller, so that the supercharging efficiency of the turbocharger 5 will become lower. Accordingly, the rise in the temperature of the exhaust gas purification device 7 may be attained, by making both the bypass pipe 8 and the auxiliary bypass pipe 80 conductive (open) under the condition that the target supercharging pressure is low, as well as by making only the bypass pipe 8 conductive (open) under the condition that the target supercharging pressure is high to some extent. According to such a method, the amount of heat, which contributes to the rise in the temperature of the exhaust gas purification device 7, can be made to increase, while suppressing an excessive reduction in the supercharging pressure.

Other Embodiment

A heat insulation coat may be applied to an inner wall surface of the bypass pipe 8 in the above-mentioned first through third embodiments, and to an inner wall surface of the auxiliary bypass pipe 80 in the above-mentioned third embodiment. In that case, it is possible to decrease the amount of heat which is dissipated from the exhaust gas through the wall surface of the bypass pipe 8 or the wall surface of the auxiliary bypass pipe 80, at the time when the exhaust gas flows through the bypass pipe 8 or the auxiliary bypass pipe 80. As a result, the oxidation reaction of the unburnt fuel with oxygen in the exhaust gas purification device 7 becomes more active, so that the amount of heat contributing to raising the temperature of the exhaust gas purification device 7 becomes larger.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-172419, filed on Aug. 22, 2013, which is hereby incorporated by reference herein in its entirety.

What is claimed is:

1. A control apparatus comprising:
an internal combustion engine having a plurality of cylinders and a plurality of fuel injectors, the plurality of cylinders are grouped into a first cylinder group and a second cylinder group;
a first exhaust passage that is connected to said internal combustion engine, with an exhaust gas of said first cylinder group flowing therethrough;
a second exhaust passage that is connected to said internal combustion engine, with an exhaust gas of said second cylinder group flowing therethrough;
a third exhaust passage that is formed by merging of said first exhaust passage and said second exhaust passage;
a centrifugal supercharger that is equipped with a turbine arranged at a merging portion of said first exhaust passage and said second exhaust passage or in said third exhaust passage;
an exhaust gas purification device that is arranged in said third exhaust passage at a location downstream of said turbine of said centrifugal supercharger, with a catalyst having an oxidation function being received therein;
a bypass passage that branches from said first exhaust passage, and merges into said third exhaust passage at a location upstream of said exhaust gas purification device, while bypassing said turbine;
a waste gate valve that switches opening and closing of said bypass passage; and
an electronic control unit operatively connected to said waste gate valve and said plurality of fuel injectors, said electronic control unit configured to:
carry out an imbalance processing by controlling the plurality of fuel injectors such that an air fuel ratio of a mixture to be combusted in a cylinder of either one of said first cylinder group and said second cylinder group is made richer than a stoichiometric air fuel ratio, and an air fuel ratio of a mixture to be combusted in a cylinder of the other of said first cylinder group and said second cylinder group is made leaner than the stoichiometric air fuel ratio; and
control said waste gate valve so as to open said bypass passage when the imbalance processing is carried out by said electronic control unit,
wherein when said electronic control unit cannot control said waste gate valve to open said bypass passage, said electronic control unit controls the plurality of fuel injectors such that an air fuel ratio of a mixture to be combusted in each of a part of the cylinders of said first cylinder group is made leaner than the stoichiometric air fuel ratio, and at the same time, an air fuel ratio of a mixture to be combusted in each of the remaining cylinders of said first cylinder group is made richer than the stoichiometric air fuel ratio, and
said electronic control unit controls the plurality of fuel injectors such that an air fuel ratio of a mixture to be combusted in each of a part of the cylinders of said second cylinder group leaner than the stoichiometric air fuel ratio, and at the same time, an air fuel ratio of a mixture to be combusted in each of the remaining cylinders of said second cylinder group is made richer than the stoichiometric air fuel ratio.

2. The control apparatus for an internal combustion engine as set forth in claim 1, wherein when the imbalance processing is carried out said electronic control unit controls said plurality of fuel injectors to have an air fuel ratio of a mixture to be combusted in a cylinder of said first cylinder group richer than the stoichiometric air fuel ratio, and at the same time, have an air fuel ratio of a mixture to be combusted in a cylinder of said second cylinder group leaner than the stoichiometric air fuel ratio.

3. The control apparatus as set forth in claim 2, further comprising:
an auxiliary bypass passage that branches from said second exhaust passage, and merges into said third exhaust passage at a location upstream of said exhaust gas purification device, while bypassing said turbine; and
an auxiliary waste gate valve that switches opening and closing of said auxiliary bypass passage;
wherein when in cases where the imbalance processing is carried out, said electronic control unit controls said waste gate valve so that said bypass passage is opened, and also controls said auxiliary waste gate valve so that said auxiliary bypass passage is opened.

4. The control apparatus as set forth in claim 1, further comprising:
an auxiliary bypass passage that branches from said second exhaust passage, and merges into said third exhaust passage at a location upstream of said exhaust gas purification device, while bypassing said turbine; and
an auxiliary waste gate valve that switches opening and closing of said auxiliary bypass passage;
wherein when the imbalance processing is carried out, said electronic control unit controls said waste gate valve so that said bypass passage is opened, and also controls said auxiliary waste gate valve so that said auxiliary bypass passage is opened.

* * * * *